United States Patent
Sloan et al.

(10) Patent No.: US 10,849,323 B2
(45) Date of Patent: Dec. 1, 2020

(54) HERBICIDAL COMPOSITION AND METHOD

(71) Applicant: Arysta LifeScience Inc., Cary, NC (US)

(72) Inventors: James Sloan, Southsea (GB); John Martin Groome, Hampshire (GB); Hong Zhang, Cary, NC (US); Robbie Haines, Worcestershire (GB); Charlie James Flood, Worcestershire (GB); Alix Bramaud Du Boucheron, Gorre (FR); Pascale Labatut, Toulouse (FR); Christophe Fillon, Parbayse (FR); Christophe Sepulchre De Conde, Pau (FR)

(73) Assignee: ARYSTA LIFESCIENCE INC., Cary, NC (US)

( * ) Notice: Subject to any disclaimer, the term of this patent is extended or adjusted under 35 U.S.C. 154(b) by 0 days.

(21) Appl. No.: 16/100,977

(22) Filed: Aug. 10, 2018

(65) Prior Publication Data

US 2019/0045785 A1   Feb. 14, 2019

Related U.S. Application Data

(60) Provisional application No. 62/544,409, filed on Aug. 11, 2017.

(51) Int. Cl.
| | | |
|---|---|---|
| *A01N 43/653* | (2006.01) | |
| *A01N 25/04* | (2006.01) | |
| *A01N 25/22* | (2006.01) | |
| *A01N 41/10* | (2006.01) | |
| *A01N 47/36* | (2006.01) | |

(52) U.S. Cl.
CPC .......... *A01N 43/653* (2013.01); *A01N 25/04* (2013.01); *A01N 25/22* (2013.01); *A01N 41/10* (2013.01); *A01N 47/36* (2013.01)

(58) Field of Classification Search
CPC combination set(s) only.
See application file for complete search history.

(56) References Cited

U.S. PATENT DOCUMENTS

| 6,046,134 A | * | 4/2000 | De Gennaro | .......... A01N 41/10 |
|---|---|---|---|---|
| | | | | 504/133 |
| 2003/0060367 A1 | | 3/2003 | Bieringer et al. | |
| 2011/0143938 A1 | | 6/2011 | Fowler et al. | |
| 2019/0053496 A1 | * | 2/2019 | Yokoyama | ............. A01N 43/90 |

FOREIGN PATENT DOCUMENTS

| CN | 103609566 | * | 3/2014 |
|---|---|---|---|
| WO | 2016102499 A1 | | 6/2016 |

OTHER PUBLICATIONS

Machine translation of CN 103609566 (Mar. 2014).*
HCAPLUS abstract 2014:349429 (2014).*
ISR and Written Opinion for PCT/US2018/046259, dated Sep. 28, 2018.

* cited by examiner

*Primary Examiner* — John Pak
(74) *Attorney, Agent, or Firm* — Cantor Colburn LLP

(57) ABSTRACT

An herbicidal composition and method. An oil dispersion is described including one or more base oils; an herbicide composition comprising an herbicide composition comprising a triazolinone, a 4-hydroxyphenylpyruvate dioxygenase inhibitor, and a sulfonylurea; and a stabilizer comprising a phosphoric acid and/or a phosphoric acid derivative, and/or a mixture of phosphoric acid and/or phosphoric acid derivative with urea and/or a urea derivative; the dispersion demonstrating an enhanced spectrum of weed control and enhanced stability. A method of preparing an herbicidal composition and a method of controlling weeds are also described.

12 Claims, 1 Drawing Sheet

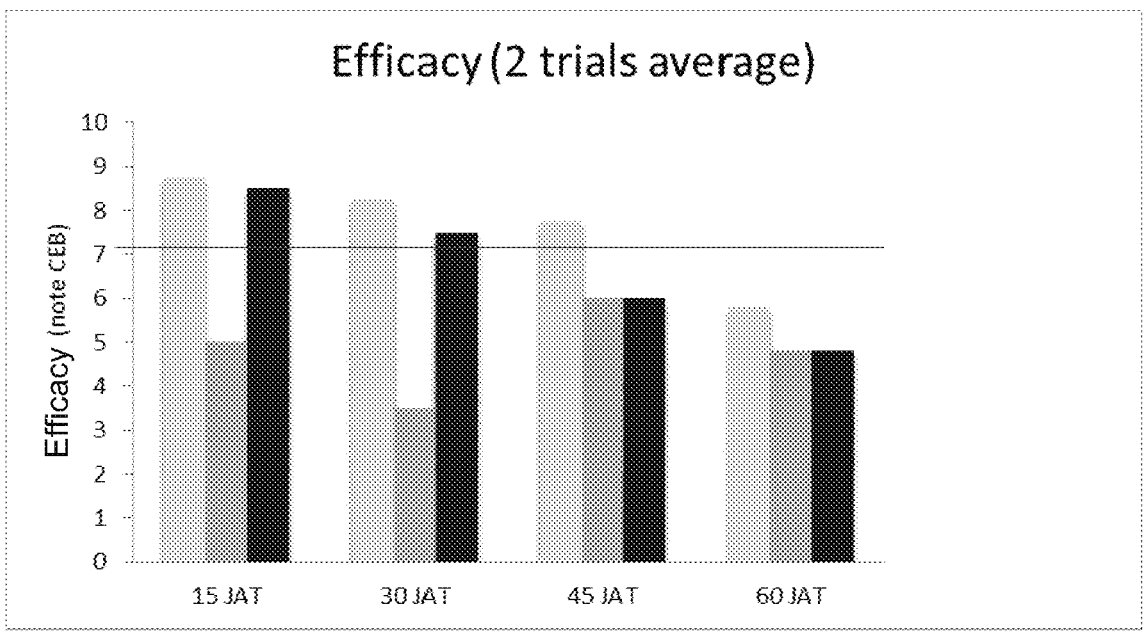
JAT = days

HERBICIDAL COMPOSITION AND METHOD

CROSS-REFERENCE TO RELATED APPLICATION

This application claims the benefit under 35 U.S.C. § 119(e) of U.S. Provisional Application No. 62/544,409 filed Aug. 11, 2017, the disclosure of which is expressly incorporated by reference herein in its entirety.

TECHNICAL FIELD

The field of art to which this invention generally pertains is herbicidal compositions.

BACKGROUND

Because of the increasing concern over use of organic solvents in agricultural formulations due to their cost, flammability, adverse health effects and contribution to environmental pollution, aqueous formulations have seen increasing use. The oil-in-water emulsion (EW) is one of the most common aqueous formulations used for many agricultural products, where droplets of oil stabilized by surfactant emulsifiers as a discrete phase are uniformly dispersed in water as a continuous phase. However, chemical stability challenges can exist with some of these herbicidal formulations, especially with some active chemicals which are extremely effective individually, but can interact at various temperatures over time when they are combined together.

Accordingly, there is a constant search for enhancing the stability of effective herbicidal chemical combinations in this area.

BRIEF SUMMARY

An oil dispersion is described comprising one or more base oils; an herbicide composition comprising a triazolinone, a 4-hydroxyphenylpyruvate dioxygenase inhibitor, and a sulfonylurea; and a stabilizer comprising a phosphoric acid and/or a phosphoric acid derivative (e.g. salts such as sodium phosphate) and/or a mixture of phosphoric acid and/or phosphoric acid derivative with urea and/or a urea derivative (such as thiourea); the dispersion demonstrating an enhanced spectrum of weed control and enhanced physical and chemical stability.

Additional embodiments include: the oil dispersion described above, where the triazolinone is amicarbazone, and/or the 4-hydroxyphenylpyruvate dioxygenase inhibitor is mesotrione, and/or the sulfonylureas is nicosulfuron; the oil dispersion described above where the stabilizer is a phosphoric acid and/or a phosphoric acid derivative; the oil dispersion described above, where the stabilizer is a mixture of phosphoric acid and/or phosphoric acid derivative with urea and/or a urea derivative; the oil dispersion described above, where the dispersion is physically stable at temperatures at least as low as −10° C. for at least two weeks; the oil dispersion described above, where the dispersion is physically stable at temperatures at least as low as −10° C. for at least two months; the oil dispersion described above, where the phosphoric acid and/or a phosphoric acid derivative is present in an amount of 0.01% to 10% by weight, and the urea and/or a urea derivative is present in an amount of 0.01% to 10% by weight; the oil dispersion described above, where the chemical retention for nicosulfuron is above 80% by weight for at least two weeks at temperatures of at least 54° C.; the oil dispersion described above, where the chemical retention of the nicosulfuron is above 93%, for example 97%, by weight for at least two weeks at temperatures of at least 54° C.; the oil dispersion described above, where the chemical retention of the amicarbazone and mesotrione are each above 95% by weight; the oil dispersion described above, where the chemical stability of the amicarbazone, mesotrione and nicosulfuron are each above 95% by weight for at least 8 weeks at temperatures of at least 40° C.; the oil dispersion described above, where the chemical stability of the amicarbazone, mesotrione and nicosulfuron are each above 95% by weight for at least 12 weeks at temperatures of at least 35° C.; the oil dispersion described above, containing 0.5% by weight phosphoric acid and 0.5% by weight to 1% by weight urea, where the nicosulfuron chemical retention is at least 93% by weight for at least two weeks at a temperature of at least 54° C., and the chemical retention of the amicarbazone and mesotrione are each above 95% by weight; the oil dispersion described above, where the chemical retention of the nicosulfuron, mesotrione and amicarbazone are each at least 95% by weight for at least eight weeks at temperature of at least 40° C.; the oil dispersion described above, where the chemical retention of the nicosulfuron, mesotrione and amicarbazone are each at least 95% by weight for at least twelve weeks at temperature of at least 35° C.; the oil dispersion described above, where the dispersion demonstrates enhanced weed control on a weed spectrum of grasses, broadleaf weeds and sedge; the oil dispersion described above, where the oil is present in the dispersion in an amount up to 90 percent by volume; the oil dispersion described above, where the oil is present in the dispersion in an amount from 10 to 80 percent by volume; the oil dispersion described above, additionally containing a dispersant, said dispersant comprising an oil-soluble nonionic surfactant and an emulsifier system, the emulsifier system comprising one or more anionic surfactants and/or one or more non-ionic surfactants; the oil dispersion described above, where the herbicide is present in an amount in a range from about 2 to about 50 weight percent of the oil dispersion; the oil dispersion described above, where the base oil is selected from the group consisting of soybean oil, rapeseed oil, olive oil, castor oil, sunflower seed oil, coconut oil, corn oil, cottonseed oil, linseed oil, palm oil, peanut oil, safflower oil, sesame oil, tung oil kapok oil, *papaya* oil, *camellia* oil, rice bran oil, esters of any of the foregoing, alkoxylated oils of any of the foregoing, methyl and ethyl esters of fatty acids, mineral oils, paraffinic and isoparaffinic oils, esters, aromatic solvents, and combinations of one or more of the foregoing; the oil dispersion described above, where the base oil is selected from the group consisting of methylated rapeseed oil, ethoxylated soybean oil, methyl-5-(dimethylamino)-2-methyl-5-oxopentanoate, alkyl dimethylamide, 2-ethylhexyl lactate, methyl caprylate caproate, methyl stearate, canola oil, and combinations of one or more of the foregoing; the oil dispersion described above, where the dispersant is present in a range of about 0.1 to about 20 percent by weight of the oil dispersion; the oil dispersion described above, where dispersant is present in a range of about 0.5 to about 10 percent by weight of the oil dispersion; the oil dispersion described above, where dispersant is present in a range of about 0.5 to about 5.0 percent by weight of the oil dispersion; the oil dispersion described above, where the nonionic surfactant of the emulsifier system comprises one or more nonionic surfactants selected from the group consisting of fatty alcohol ethoxylates, tristyrylphenol ethoxylates, alkylphenolethoxylates, castor oil ethoxylates, fatty acid ethoxylates, alkylpolyglucosides, sorbitan ethoxylates, and ethylene oxide-propylene oxide-ethylene oxide block copolymers; the oil dispersion described above, where the anionic surfactant of the emulsifier system comprises one or more anionic surfactants selected from the group consisting of salts of dodecylbenzenesulfonate, sodium dioctylsulfosuccinate, salts of tristyrylphenol ethoxylate phosphates, salts of fatty acids, salts of alkyl sulfates, salts of alkylether sulfates, salts of alkylether phosphates, and sodium N-methyl-N-oleyltaurate; the oil dispersion described above, where the emulsifier system is present in a range from about 0.1 to about 20 percent by weight of the oil dispersion; the oil dispersion described above, where the emulsifier system is present in a range from about 3 to about 15 percent by weight of the oil dispersion; the oil dispersion described above, where the emulsifier system is present in a range from about 5 to about 12 percent by weight of the oil dispersion; the oil dispersion described above, where the ratio of anionic to non-ionic surfactant is in a range from about 0.1:10 to about 10:0.1; the oil dispersion described above, where the ratio of anionic to non-ionic surfactant is in a range from about 1:5 to about 5:1; the oil dispersion described above, where the ratio of anionic to non-ionic surfactant is in a range from about 1:3 to 3:1; the oil dispersion described above, additionally containing a thickener; the oil dispersion described above, where the thickener is a hydrophobic fumed silica, bentonite, castor wax, magnesium stearate, aluminum/magnesium hydroxide stearate, or polymeric thickener, or combinations thereof; the oil dispersion described above, where the composition comprises about 0.01 to about 10 percent by weight of the thickener; the oil dispersion described above, where the composition comprises about 0.1 to about 3 percent by weight of thickener; and the oil dispersion described above, additionally containing one or more additives comprising an absorbent, an antifoaming agent, a stabilizer, an antifreeze agent, a base, an acid, and a buffer.

A method of preparing an herbicidal composition as an oil dispersion is also described including mixing an herbicide comprising an herbicide composition comprising a triazolinone, a 4-hydroxyphenylpyruvate dioxygenase inhibitor, and a sulfonylurea; and a stabilizer comprising a phosphoric acid and/or a phosphoric acid derivative, and/or a mixture of phosphoric acid and/or phosphoric acid derivative with urea and/or a urea derivative; one or more base oils, a dispersant comprising an oil soluble nonionic surfactant, and an emulsifier system, the emulsifier system comprising one or more anionic surfactants and/or one or more non-ionic surfactants to provide an herbicidal mixture; and diluting the mixture with water;

Additional embodiments include: the method described above, where the triazolinone is amicarbazone, and/or the 4-hydroxyphenylpyruvate dioxygenase inhibitor is mesotrione, and/or the sulfonylureas is nicosulfuron; the method described above, where the stabilizer is a phosphoric acid and/or a phosphoric acid derivative; the method described above, where the stabilizer is a mixture of phosphoric acid and/or phosphoric acid derivative with urea and/or a urea derivative; the method described above, where the herbicide is present in an amount in a range from about 2 to about 50 weight percent of the herbicidal mixture; the method described above, where the base oil is selected from the group consisting of soybean oil, rapeseed oil, olive oil, castor oil, sunflower seed oil, coconut oil, corn oil, cottonseed oil, linseed oil, palm oil, peanut oil, safflower oil, sesame oil, tung oil kapok oil, *papaya* oil, *camellia* oil, rice bran oil, esters of any of the foregoing, alkoxylated oils of any of the foregoing, methyl and ethyl esters of fatty acids, mineral oils, paraffinic and isoparaffinic oils, esters, aromatic solvents, and combinations of one or more of the foregoing; The method described above, further comprising a thickener; the method described above, where the thickener is selected from the group consisting of hydrophobic fumed silicas, bentonite, castor wax, magnesium stearate, aluminum/magnesium hydroxyl stearate, and combinations of one or more of the foregoing; the method described above, further comprising adding one or more additives selected from the group consisting of an absorbent, an antifoaming agent, a stabilizer, an antifreeze agent, a base, an acid, and a buffer; the method described above, where the diluted mixture comprises at least 50 percent by weight water; the method described above, where the diluted mixture comprises between about 50 to about 99.99 percent by weight water; and the method described above, where the diluted mixture comprises between about 60 to about 90 percent by weight water.

A method of controlling weeds is also described including providing an herbicidal mixture comprising: an herbicide comprising a triazolinone, a 4-hydroxyphenylpyruvate dioxygenase inhibitor, and a sulfonylurea; and a stabilizer comprising a phosphoric acid and/or a phosphoric acid derivative, and/or a mixture of phosphoric acid and/or phosphoric acid derivative with urea and/or a urea derivative; one or more base oils, a dispersant comprising an oil soluble nonionic surfactant, and an emulsifier system, the emulsifier system comprising one or more anionic surfactants and/or one or more non-ionic surfactants; diluting the herbicidal mixture with water, where the herbicidal mixture is formulated as oil dispersion in water; and applying the diluted herbicidal mixture to a crop.

Additional embodiments include: the method described above, where the triazolinone is amicarbazone, and/or the 4-hydroxyphenylpyruvate dioxygenase inhibitor is mesotrione, and/or the sulfonylureas is nicosulfuron; the method described above, where the stabilizer is a phosphoric acid and/or a phosphoric acid derivative; the method described above, where the stabilizer is a mixture of phosphoric acid and/or phosphoric acid derivative with urea and/or a urea derivative; the method described above, where the applying step is performed post-emergently after the crop breaks ground; t method described above, where the applying step is performed pre-emergently before the crop breaks ground; the method described above, where the herbicide is present in an amount in a range from about 2 to about 50 weight percent of the herbicidal composition; the method described above, where the base oil is selected from the group consisting of soybean oil, rapeseed oil, olive oil, castor oil, sunflower seed oil, coconut oil, corn oil, cottonseed oil, linseed oil, palm oil, peanut oil, safflower oil, sesame oil, tung oil kapok oil, *papaya* oil, *camellia* oil, rice bran oil, esters of any of the foregoing, alkoxylated oils of any of the foregoing, methyl and ethyl esters of fatty acids, mineral oils, paraffinic and isoparaffinic oils, esters, aromatic solvents, and combinations of one or more of the foregoing; the method described above, where the herbicidal composition further comprises thickener; the method described above, where the herbicidal composition further comprises one or more additives selected from the group consisting of an absorbent, an antifoaming agent, a stabilizer, an antifreeze agent, a base, an acid, and a buffer;

These, and additional embodiments, will be apparent from the following descriptions.

BRIEF DESCRIPTION OF THE DRAWING

The FIGURE demonstrates exemplary efficacy data for exemplary compositions described herein.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

What is disclosed herein is an effective herbicidal composition again a broad weed spectrum, having improved chemical stability of all of active ingredients including amicarbazone, mesotrione and nicosulfuron. The combination provides a broader weed spectrum control than amicarbazone and mesotrione alone, and in admixture.

The herbicidal compositions described herein include amicarbazone, and mesotrione, and nicosulfuron, and methods of their use in admixture. It was found to be challenging to develop amicarbazone and mesotrione premix formulation alone due to the predicted side reaction between above two molecules. It was found to be even more challenging to develop amicarbazone and mesotrione and nicosulfuron premix formulation with stable chemistry. However, it has been discovered that by including stabilizing amounts of phosphoric acid, or a combination of phosphoric acid and urea, to the above three active herbicidal ingredients the desired degree of chemical stability of the ingredients is attained in an herbicidal oil dispersion formulation.

By being able to include all three active ingredient with chemical stability into an herbicidal premix formulation, a significantly increased control spectrum of weed management can be attained.

EXAMPLES

Without the inclusion of the above stabilizers, chemical retention for nicosulfuron, for example, for two weeks at 54° C. is below 80% by weight. With inclusion of the above phosphoric acid and urea stabilizers, the retention and stability of the nicosulfuron under the same conditions improves to over 93%, while still keeping the other two active herbicide ingredients (amicarbazone, and mesotrione) in the formulation above 95% retention, again, under the same testing conditions. In fact, all three active ingredients can be retained in the stabilized herbicidal pre-mix formulations at a level above 95% by weight for at least 8 weeks at a temperature of at least 40° C. and even 12 weeks or more at temperatures of at least 35° C. In addition, the pre-mix formulation, when mixed with water, exhibits an increased spectrum of weed control. It has been found that with an addition of, for example, of 0.5% by weight phosphoric acid and 0.5% to 1% by weight urea, nicosulfuron chemical retention increases from approximately 70% to 93% for at least 2 weeks at at least 54° C., while the amicarbazone and mesotrione in the pre-mix formulation is retained and remains above 95%. With the addition of similar amounts of the phosphoric acid and urea stabilizers, all three active ingredients including the nicosulfuron, mesotrione and amicarbazone, are chemically retained when stored above at least 95% for at least 8 weeks at a temperature of at least 40° C. and for at least 12 weeks at temperatures of at least 35° C., respectively. An exemplary composition includes, for example, amicarbazone 112 grams/liter mesotrione 112 grams/liter and nicosulfuron 60 grams/liter, respectively.

Additional benefits and details are demonstrated, for example, in the Tables below, for multiple exemplary compositions demonstrating their stability at various time periods and temperatures. The composition also demonstrates physical properties stability at low temperatures as described herein, e.g., phase separation stability, formulation uniformity, particle size, emulsion stability, etc.

TABLE 1

| Example | Non-Aqueous Dispersant | Aqueous Dispersant | Emulsifier System | | | % urea | % phosphoric acid |
|---|---|---|---|---|---|---|---|
| 1 | 3% alkylated vinyl pyrrolidones | 2% polymeric amphoteric dispersant | 3% sodium dioctyl sulfosuccinate | 4.5% polyoxyethylene (40) sorbitol hexaoleate | 4.5% ethoxylated castor oil | 0.00 | 0.00 0.20 0.40 0.50 0.70 0.90 |
| 2 | 3% alkylated vinyl pyrrolidones | 2% polymeric amphoteric dispersant | 3% sodium dioctyl sulfosuccinate | 4.5% polyoxyethylene (40) sorbitol hexaoleate | 4.5% ethoxylated castor oil | 0.00 0.25 0.50 0.75 1.00 1.5 2.0 | 0.50 |
| 3 | 3% alkylated vinyl pyrrolidones | 2% polymeric amphoteric dispersant | 3% sodium dioctyl sulfosuccinate | 4.5% polyoxyethylene (40) sorbitol hexaoleate | 4.5% ethoxylated castor oil | 0.00 0.25 0.50 0.75 1.00 1.5 2.0 | 0.50 |
| 4 | 3% alkylated vinyl pyrrolidones | 2% polymeric amphoteric dispersant | 3% sodium dioctyl sulfosuccinate | 4.5% polyoxyethylene (40) sorbitol hexaoleate | 4.5% ethoxylated castor oil | 0.00 0.25 0.50 0.75 1.00 1.5 2.0 | 0.50 |
| 5 | 3% alkylated vinyl pyrrolidones | 2% polymeric amphoteric dispersant | 3% sodium dioctyl sulfosuccinate | 4.5% Tensiofix nonionic surfactant | 4.5% ethoxylated castor oil | 0.75 | 0.75 |
| 6 | 3% nonionic block copolymer | 2% polymeric amphoteric dispersant | 3% sodium dioctyl sulfosuccinate | 4.5% polyoxyethylene (40) sorbitol hexaoleate | 4.5% ethoxylated castor oil | 0.00 0.50 0.50 0.00 0.75 1.0 | 0.50 0.50 0.75 0.75 0.75 1.00 |
| 7 | 3% nonionic block copolymer | 2% polymeric amphoteric dispersant | 3% sodium dioctyl sulfosuccinate | 4.5% polyoxyethylene (40) sorbitol hexaoleate | 4.0% ethoxylated castor oil | 0.75 | 0.75 |

| Example | Thickener | Storage | Amicarbazone (% of −10° C.) | Mesotrione (% of −10° C.) | Nicosulfuron (% of −10° C.) |
|---|---|---|---|---|---|
| 1 | 1% Bentone 1000 | 2 weeks at 54° C. | could not be sampled 90.7 93.2 94.2 92.4 91.3 | could not be sampled 98 101.8 101.4 101.3 100.3 | could not be sampled 65.3 76.2 76.21 78.8 78.8 |
| 2 | 1% Bentone SD-1 | 2 weeks at 54° C. | 93.7 92.1 92.7 94.3 93.3 93 92 | 97.3 95.8 94 94.9 93.6 93.4 88.8 | 76.2 79.2 78.3 79.2 94 93.6 94.4 |
| 3 | 1% Bentone SD-1 | 8 weeks at 40° C. | 95.9 95.4 96 96.4 / / / | 96.1 97.5 97.5 97.4 / / / | 99.3 93 92.4 94.2 / / / |
| 4 | 1% Bentone SD-1 | 12 weeks at 35° C. | 97.9 96 95.5 96.5 / / / | 96.2 98.1 98 98.7 / / / | 101 95.7 96.5 98.5 / / / |
| 5 | 1% Bentone SD-1 | 2 weeks at 54° C. | 95.1 | 98 | 85.9 |

TABLE 1-continued

| | | | | | |
|---|---|---|---|---|---|
| 6 | 1% Bentone SD-1 | 8 weeks at 40° C. | 92.7 | 98.5 | 93.1 |
| | | | 91.5 | 97 | 90.7 |
| | | | 93.1 | 97.6 | 93 |
| | | | 91.8 | 98.2 | 93.6 |
| | | | 91.2 | 95.8 | 93 |
| | | | 93.4 | 96.9 | 93.9 |
| 7 | 0.25% Bentone SD-1 | 2 weeks at 54° C. | 88.8 | 95.2 | 85.3 |
| | 0.25% Bentone SD-3 | | 88.7 | 97.0 | 89.5 |
| | 0.25% Bentone SD-3 0.25% Bentone SD-1 | | 87.9 | 95.6 | 87.9 |
| | 0.12% Bentone SD-3 0.1% Bentone SD-1 | | 89.1 | 95.9 | 87.4 |
| | 0.2% Bentone SD-3 0.15% Bentone SD-1 | | 89.3 | 96.1 | 87.8 |
| | 1% Attagel 50 | | 89.7 | 94.9 | 87.7 |

TABLE 2

Calculated as percentage of initial analysis:

| Example Number | Initial | | | 2 weeks at −10° C. | | | 2 weeks at 54° C. | | | 2 months at −10° C. | | | 2 months at 40° C. | | |
|---|---|---|---|---|---|---|---|---|---|---|---|---|---|---|---|
| | AMZ | MST | NCS | AMZ | MST | NCS | AMZ | MST | NCS | AMZ | MST | NCS | AMZ | MST | NCS |
| 1 | 11.02 | 11.38 | 5.88 | — | — | — | 10.26 | 11.12 | 5.29 | — | — | — | 10.53 | 11.21 | 5.68 |
| | N/A | N/A | N/A | — | — | — | 93% | 98% | 90% | — | — | — | 96% | 99% | 97% |
| 2 | 10.72 | 11.43 | 6.11 | 10.97 | 11.61 | 6.23 | 10.30 | 11.14 | 5.53 | 10.90 | 11.32 | 6.13 | 10.55 | 11.19 | 5.89 |
| | N/A | N/A | N/A | 102% | 102% | 102% | 96% | 97% | 91% | 93% | 98% | 90% | 98% | 98% | 96% |
| 3 | 10.80 | 11.74 | 5.90 | 10.81 | 11.64 | 5.82 | 10.12 | 11.26 | 5.17 | 10.90 | 11.58 | 5.95 | 10.45 | 11.38 | 5.70 |
| | N/A | N/A | N/A | 100% | 99% | 99% | 94% | 96% | 88% | 101% | 99% | 101% | 97% | 97% | 97% |
| 4 | 10.89 | 11.46 | 5.87 | 11.17 | 11.69 | 5.92 | 10.3 | 11.12 | 5.59 | 11.04 | 11.42 | 5.93 | 10.64 | 11.17 | 5.84 |
| | N/A | N/A | N/A | 103% | 102% | 101% | 95% | 97% | 95% | 101% | 100% | 101% | 98% | 97% | 99% |

Note:
In above four compositions, all contain 5 g/L of phosphoric acid and 7.5 g/L of urea for first three, then 12.5 g/L of Urea for Example 4, respectively.

TABLE 3

Percentage at high temp calculated as percentage of −10 C. sample at the same storage interval:

| Example Number | Initial | | | 2 weeks at −10° C. | | | 2 weeks at 54° C. | | | 2 months at −10° C. | | | 2 months at 40° C. | | |
|---|---|---|---|---|---|---|---|---|---|---|---|---|---|---|---|
| | AMZ | MST | NCS | AMZ | MST | NCS | AMZ | MST | NCS | AMZ | MST | NCS | AMZ | MST | NCS |
| 1 | 11.02 | 11.38 | 5.88 | — | — | — | 10.26 | 11.12 | 5.29 | — | — | — | 10.53 | 11.21 | 5.68 |
| | N/A | N/A | N/A | N/A | N/A | N/A | — | — | — | N/A | N/A | N/A | — | — | — |
| 2 | 10.72 | 11.43 | 6.11 | 10.97 | 11.61 | 6.23 | 10.30 | 11.14 | 5.53 | 10.90 | 11.32 | 6.13 | 10.55 | 11.19 | 5.89 |
| | N/A | N/A | N/A | N/A | N/A | N/A | 94% | 96% | 89% | N/A | N/A | N/A | 97% | 99% | 96% |
| 3 | 10.80 | 11.74 | 5.90 | 10.81 | 11.64 | 5.82 | 10.12 | 11.26 | 5.17 | 10.90 | 11.58 | 5.95 | 10.45 | 11.38 | 5.70 |
| | N/A | N/A | N/A | N/A | N/A | N/A | 94% | 97% | 89% | N/A | N/A | N/A | 96% | 98% | 96% |
| 4 | 10.89 | 11.46 | 5.87 | 11.17 | 11.69 | 5.92 | 10.3 | 11.12 | 5.59 | 11.04 | 11.42 | 5.93 | 10.64 | 11.17 | 5.84 |
| | N/A | N/A | N/A | N/A | N/A | N/A | 92% | 95% | 94% | N/A | N/A | N/A | 96% | 98% | 98% |

Note:
In above four compositions, all contain 5 g/L of phosphoric acid and 7.5 g/L of urea for first three, then 12.5 g/L of urea for Example 4, respectively.

As mentioned above, the novel ready-mix herbicidal compositions described herein are effective on a broader weed spectrum, such as, for example on grasses, broadleaf weeds and sedge, which is not the case with the individual herbicidal components alone. The compositions different mode of action (MoA) or biology pathways helps make this product a very effective weed resistance management tool, especially, for example, for the corn market, among others. See also the FIGURE which demonstrates, for example, the efficacy of the compositions disclosed herein above other combinations and above the efficacy limit (red line) up to 45 days after application. H1358aa @0.2 kg/ha and nicosulfuron 40 SC @0.75 L/ha are below this limit at this date. CEB means Commission des essais Biologiques, an Efficacy trial committee. So here, level 7 is the minimum acceptable level of efficacy (i.e., greater than 85%). Sample 1 contains amicarbazone, mesotrione and nicosulfuron; Sample 2 contains amicarbazone and mesotrione; and Sample 3 contains nicosulfuron only.

The use of conventional carriers with the compositions described herein also helps prevent crystallization at low temperatures and upon dilution in water. And while individual carriers can be used, carrier mixtures of compatible carriers (for example, rapeseed oil, and aromatic 150 (a naphthalene containing solvent available from Exxon Mobile, for example) can be also used as long as the added carriers do not adversely affect the chemical stability or the solubility or water miscibility of the individual components.

Typically the components are present in the carrier in an amount of about 10% to about 90% by weight. When diluted with water, the pre-mix is typically present in an amount of about 0.01% to about 10% by weight.

The product also has extended shelf life, e.g., expected to be at least two years. The delivery system also has an acceptable toxicity profile according to current MSDS (Material Safety Data Sheets) data.

As described herein, these problems and others in this area are addressed by the invention described herein. Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An oil dispersion comprising
   a. one or more base oils;
   b. an herbicide composition comprising amicarbazone, mesotrione, and nicosulfuron, wherein the herbicide composition is present in an amount from about 2 to about 50 weight percent of the oil dispersion; and
   c. a stabilizer comprising a phosphoric acid and/or sodium phosphate and/or a mixture of phosphoric acid and/or sodium phosphate with urea and/or thiourea;
   wherein the phosphoric acid and/or sodium phosphate and/or a mixture of phosphoric acid and/or sodium phosphate is present in an amount of 0.2 to 10% by weight of the oil dispersion, and wherein the urea and/or thiourea, when present, is in an amount of 0.25 to 10% by weight of the oil dispersion,
      the dispersion demonstrating an enhanced spectrum of weed control and enhanced physical and chemical stability.

2. The oil dispersion of claim 1, containing 0.5% by weight phosphoric acid and 0.5% by weight to 1% by weight urea, wherein the nicosulfuron chemical retention is at least 93% by weight for at least two weeks at a temperature of at least 54° C., and the chemical retention of the amicarbazone and mesotrione are each above 95% by weight.

3. The oil dispersion of claim 1, wherein the oil is present in the dispersion in an amount up to 90 percent by volume.

4. The oil dispersion of claim 1, additionally containing a dispersant, said dispersant comprising an oil-soluble nonionic surfactant and an emulsifier system, the emulsifier system comprising one or more anionic surfactants and/or one or more non-ionic surfactants.

5. The oil dispersion of claim 1, wherein the base oil is selected from the group consisting of soybean oil, rapeseed oil, olive oil, castor oil, sunflower seed oil, coconut oil, corn oil, cottonseed oil, linseed oil, palm oil, peanut oil, safflower oil, sesame oil, tung oil kapok oil, papaya oil, camellia oil, rice bran oil, esters of any of the foregoing, alkoxylated oils of any of the foregoing, methyl and ethyl esters of fatty acids, mineral oils, paraffinic and isoparaffinic oils, esters, aromatic solvents, methylated rapeseed oil, ethoxylated soybean oil, methyl-5-(dimethylamino)-2-methyl-5-oxopentanoate, alkyl dimethylamide, 2-ethylhexyl lactate, methyl caprylate caproate, methyl stearate, canola oil and combinations thereof.

6. The oil dispersion of claim 4, wherein the dispersant is present in a range of about 0.1 to about 20.0 percent by weight of the oil dispersion.

7. The oil dispersion of claim 4, wherein the emulsifier system is present in a range from about 0.1 to about 20 percent by weight of the oil dispersion.

8. The oil dispersion of claim 4, wherein the emulsifier system is present in a range from about 0.1 to about 15 percent by weight of the oil dispersion.

9. The oil dispersion of claim 1, additionally containing a thickener.

10. The oil dispersion of claim 1, additionally containing one or more additives selected from an absorbent, an antifoaming agent, a stabilizer, an antifreeze agent, a base, an acid, a buffer, and combinations thereof.

11. The oil dispersion of claim 1, wherein the nicosulfuron chemical retention is at least 80% by weight for at least two weeks at a temperature of at least 54° C., and the chemical retention of the amicarbazone and mesotrione are each above 95% by weight at a temperature of at least 54° C.

12. A method of controlling weeds comprising:
   a) providing an oil dispersion comprising:
      i) an herbicide compo comprising amicarbazone, mesotrione, and nicosulfuron; and a stabilizer comprising a phosphoric acid and/or sodium phosphate, and/or a mixture of phosphoric acid and/or sodium phosphate with urea and/or thiourea,
      ii) one or more base oils,
      iii) a dispersant comprising an oil soluble nonionic surfactant, and
      iv) an emulsifier system, the emulsifier system comprising one or more anionic surfactants and/or one or more non-ionic surfactants,
      wherein the herbicide composition is present in an amount from about 2 to about 50 weight percent of the oil dispersion, the phosphoric acid and/or sodium phosphate and/or a mixture of phosphoric acid and/or sodium phosphate is present in an amount of 0.2 to 10% by weight of the oil dispersion, and wherein the urea and/or thiourea, when present, is in an amount of 0.25 to 10% by weight of the oil dispersion;
   b) diluting the oil dispersion with water to provide a diluted herbicidal mixture; and
   c) applying the diluted herbicidal mixture to a crop.

* * * * *